(12) United States Patent
Li

(10) Patent No.: US 11,404,942 B2
(45) Date of Patent: Aug. 2, 2022

(54) STATOR ASSEMBLY OF A MOTOR, A SYNCHRONOUS MOTOR AND A PASSENGER CONVEYING DEVICE

(71) Applicant: Otis Elevator Company, Farmington, CT (US)

(72) Inventor: Lib Li, Suzhou (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 146 days.

(21) Appl. No.: 16/540,395

(22) Filed: Aug. 14, 2019

(65) Prior Publication Data

US 2020/0059139 A1   Feb. 20, 2020

(30) Foreign Application Priority Data

Aug. 16, 2018 (CN) .......................... 201810933349.9

(51) Int. Cl.
*H02K 15/00* (2006.01)
*B66B 11/04* (2006.01)
*H02K 15/03* (2006.01)

(52) U.S. Cl.
CPC ........ *H02K 15/0006* (2013.01); *B66B 11/043* (2013.01); *H02K 15/03* (2013.01)

(58) Field of Classification Search
CPC .. B66B 11/043; H02K 15/0006; H02K 15/03; H02K 1/182; H02K 1/2793
See application file for complete search history.

(56) References Cited

U.S. PATENT DOCUMENTS 5,334,899 A * 8/1994 Skybyk ............... H02K 1/2793
310/114
7,898,134 B1   3/2011 Shaw
(Continued)

FOREIGN PATENT DOCUMENTS

BR   PI1001203 A2   1/2014
CN   202889153 U    4/2013
(Continued)

OTHER PUBLICATIONS

European Search Report for application EP 19192169.1, dated Dec. 17, 2019, 8 pages.
(Continued)

*Primary Examiner* — Minh N Trinh
(74) *Attorney, Agent, or Firm* — Cantor Colburn LLP

(57) ABSTRACT

A motor stator assembly, a synchronous motor and a passenger transport device are provided by the present disclosure. The motor stator assembly includes: a stator base disposed axially around a motor drive shaft, the stator base having a receiving space and two stator end faces, and the receiving space being disposed between the two stator end faces and disposed along a circumferential outer side of the stator base; and a plurality of coil assemblies each inserted in the receiving space in a radial direction of the stator base. According to the motor stator assembly, the synchronous motor and the passenger transport device of the present disclosure, by providing a plurality of coil assemblies inserted in the stator base, the maintenance or replacement can be performed as needed, the maintenance is convenient, and less time-consuming, and also has reliable performances.

10 Claims, 2 Drawing Sheets

(56) References Cited

U.S. PATENT DOCUMENTS

| | | | |
|---|---|---|---|
| 8,310,126 B1 | 11/2012 | Hopkins et al. | |
| 8,946,954 B2* | 2/2015 | Peterson | H02K 3/522 |
| | | | 310/67 R |
| 9,287,755 B2* | 3/2016 | Woolmer | H02K 15/02 |
| 2013/0026872 A1 | 1/2013 | Cirani et al. | |
| 2013/0207503 A1 | 8/2013 | Morita et al. | |
| 2014/0042852 A1 | 2/2014 | Lee et al. | |
| 2015/0061440 A1 | 3/2015 | Catalan | |
| 2015/0084472 A1 | 3/2015 | Perez et al. | |
| 2017/0047792 A1 | 2/2017 | Klassen et al. | |
| 2017/0317558 A1 | 11/2017 | Steg et al. | |
| 2020/0059139 A1* | 2/2020 | Li | H02K 15/0006 |

FOREIGN PATENT DOCUMENTS

| | | |
|---|---|---|
| CN | 204578318 U | 8/2015 |
| CN | 105305665 A | 2/2016 |
| DE | 10253072 A1 | 5/2004 |
| EP | 0693630 A2 | 1/1996 |
| JP | 2011182576 A | 9/2011 |
| JP | 5636976 B2 | 12/2014 |
| WO | 2008068503 A2 | 6/2008 |
| WO | 2016116678 A1 | 7/2016 |
| WO | 2017158247 A1 | 9/2017 |

OTHER PUBLICATIONS

European Search Report for Application No. 19192169.1; dated Dec. 15, 2020; 7 Pages.

* cited by examiner

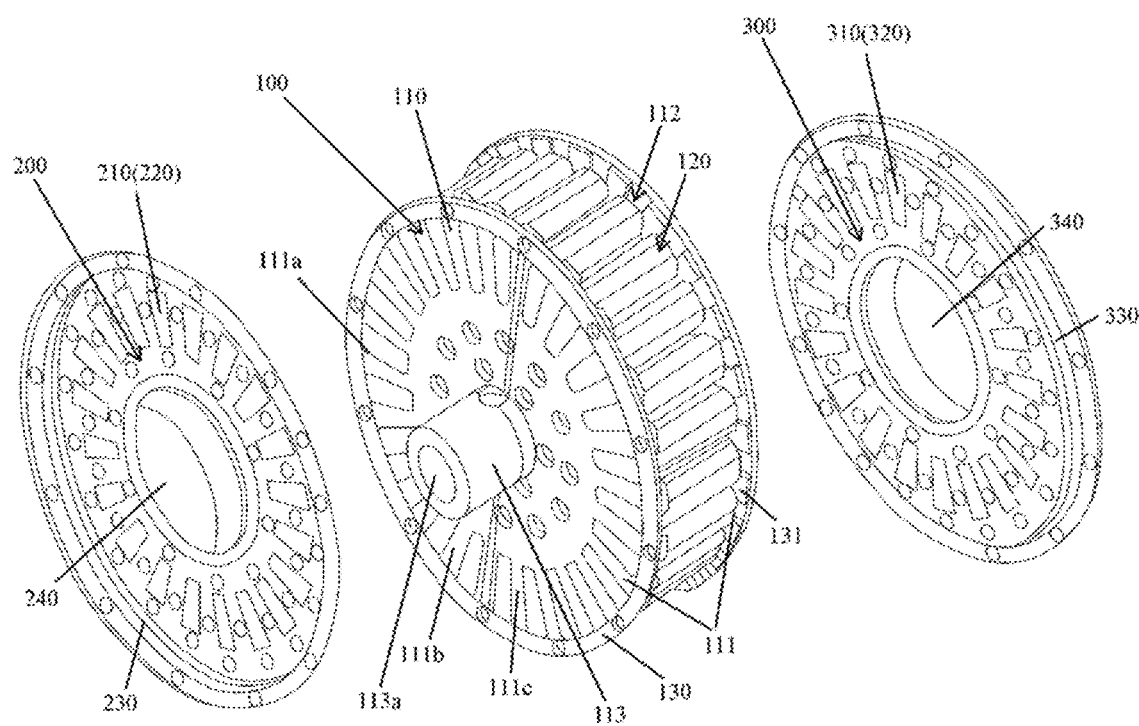
[FIG. 1]

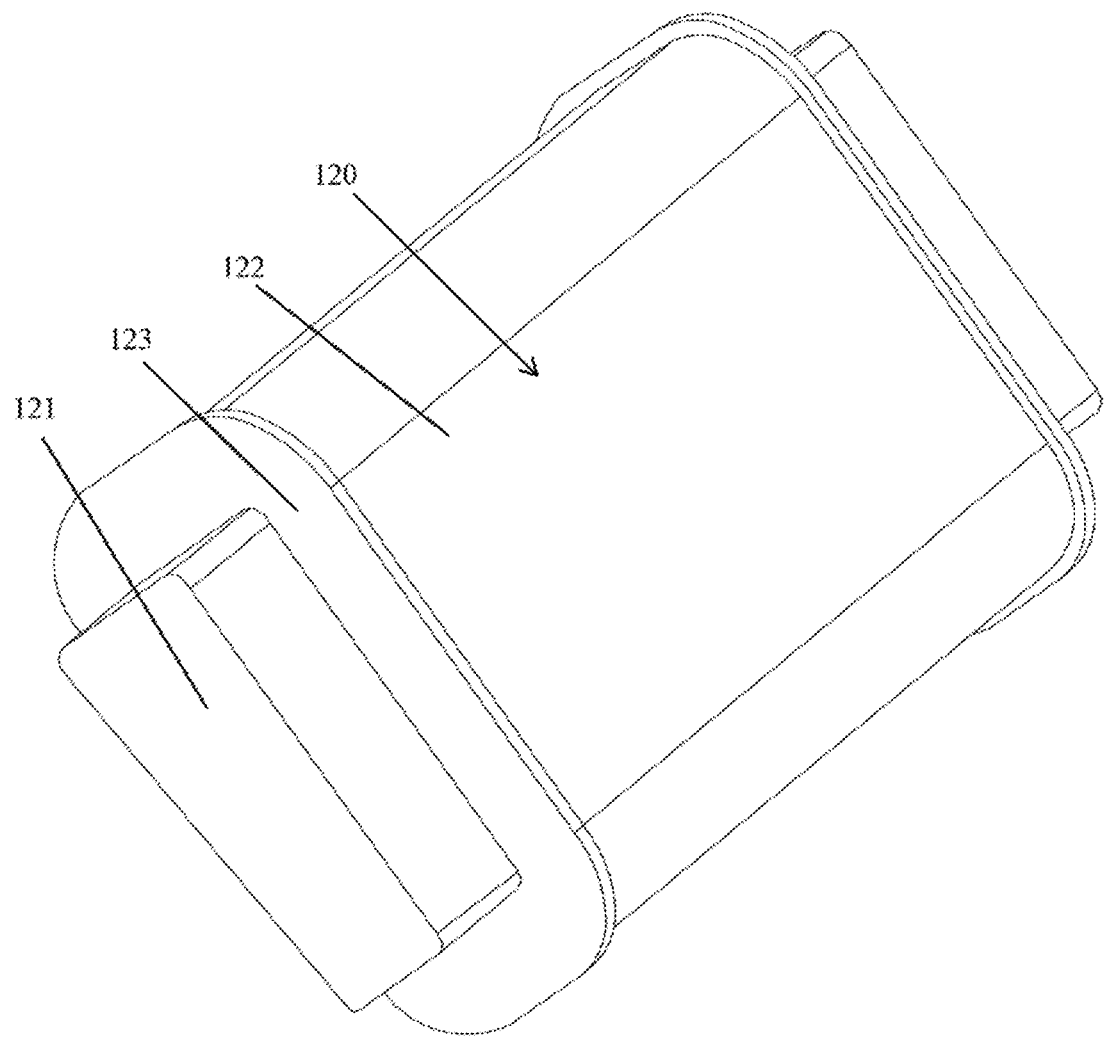
【FIG. 2】

STATOR ASSEMBLY OF A MOTOR, A SYNCHRONOUS MOTOR AND A PASSENGER CONVEYING DEVICE

FOREIGN PRIORITY

This application claims priority to Chinese Patent Application No. 201810933349.9, filed Aug. 16, 2018, and all the benefits accruing therefrom under 35 U.S.C. § 119, the contents of which in its entirety are herein incorporated by reference.

FIELD OF THE INVENTION

The present disclosure relates to the field of electric motor, and in particular to a synchronous motor that generates an axial magnetic field, and components thereof.

BACKGROUND OF THE INVENTION

With continuous improvement of the performance of permanent magnetic materials such as rare earths, permanent-magnet synchronous motors featuring high efficiency and high power density have been rapidly developed, and have been widely used in many industrial fields such as elevators and automobiles.

Permanent-magnet synchronous motors are generally classified into axial magnetic field type permanent-magnet synchronous motors and radial magnetic field type permanent-magnet synchronous motors. The axial magnetic field type permanent-magnet synchronous motor not only has the characteristics of short axial dimension, small volume and compact structure, but also has obvious advantages in many special applications due to its high torque density and high efficiency, and has become a research hotspot. It is mainly used in motion control, and is especially suitable for direct drive applications where there is a requirement on lower axial size and a large torque demand, such as elevator drive motor.

For such motors, an overall maintenance is required to repair or replace parts. For example, if there is a problem with the stator, the entire stator needs to be replaced, and the repair is relatively complicated.

Therefore, how to provide a permanent-magnet synchronous motor and components thereof that are more convenient to service has become an urgent technical problem to be solved.

SUMMARY OF THE INVENTION

The present disclosure aims to provide a motor stator assembly that is easy to service.

The present disclosure also aims to provide a synchronous motor that is easy to service.

The present disclosure also aims to provide a passenger transport device having a synchronous motor that is easy to service.

In order to achieve the objects of the present disclosure, according to an aspect of the present disclosure, a motor stator assembly is provided, which includes: a stator base disposed axially around a motor drive shaft, the stator base having a receiving space and two stator end faces, and the receiving space being disposed between the two stator end faces and disposed along a circumferential outer side of the stator base; and a plurality of coil assemblies each inserted in the receiving space in a radial direction of the stator base.

Optionally, a plurality of positioning holes are disposed in the stator end faces of the stator base; wherein in an assembled state, the coil assemblies are embedded in the positioning holes of the stator base; and in a disassembled state, the coil assemblies are removed out of the positioning holes of the stator base.

Optionally, the plurality of positioning holes are uniformly arranged in the stator end faces in a circumferential direction, and the coil assemblies are uniformly embedded in the positioning holes in the circumferential direction.

Optionally, positioning rings are further included, which are sleeved over outer edges of the stator end faces and configured to restrict the coil assemblies from being disengaged radially outward from the receiving space.

Optionally, positioning protrusions facing the receiving space are circumferentially disposed on the positioning rings, wherein the positioning protrusions are captured between adjacent coil assemblies, and are configured to restrict the coil assemblies from being disengaged radially outward from the receiving space.

Optionally, a drive sleeve extending in an axial direction is disposed in a middle portion of the stator base, and a drive shaft hole is axially disposed in the drive sleeve.

Optionally, the stator base is integrally formed.

Optionally, the stator end faces are formed by connecting a plurality of stator end face sections.

Optionally, the coil assembly includes: a core extending in an axial direction; a coil disposed axially around the core; and a coil base disposed axially around the core; wherein the coil base limits two axial ends of the coil.

Optionally, the core has an isosceles trapezoid-shaped cross section or a sector ring-shaped cross section in the axial direction.

Optionally, the core is formed by laminating ferromagnetic materials.

Optionally, the coil is made of a copper wire coated by an insulating layer.

Optionally, the coil base is made of a flame retardant material having a temperature resistance of no less than 100° C.

In order to achieve the objects of the present disclosure, according to another aspect of the present disclosure, a synchronous motor is further provided, which is configured to generate an axial magnetic field, the synchronous motor including: the motor stator assembly as described above; a first rotor disc and a second rotor disc respectively disposed on two sides of the stator base in an axial direction; and a drive shaft which passes through the first rotor disc, the motor stator assembly, and the second rotor disc sequentially in the axial direction.

Optionally, the first rotor disc is circumferentially provided with a plurality of permanent magnets on a side thereof facing the stator base; and/or the second rotor disc is circumferentially provided with a plurality of permanent magnets and/or steel magnets on a side thereof facing the stator base.

Optionally, a plurality of mounting slots are disposed in the first rotor disc and/or the second rotor disc, and the plurality of permanent magnets and/or steel magnets are embedded in the mounting slots.

Optionally, the plurality of permanent magnets are arranged in a circumferential direction with positive poles and negative poles being alternated; and/or the plurality of steel magnets are arranged in a circumferential direction with positive poles and negative poles being alternated.

Optionally, a positioning strip is disposed along a circumferential outer side on a side of the first rotor disc and/or the second rotor disc that faces the stator base, and positioning slots are disposed on two sides of the stator base, the positioning strips being fitted into the positioning slots.

Optionally, a middle portion of the first rotor disc and/or the second rotor disc is provided with a matching hole extending in the axial direction for the drive shaft to pass through.

In order to achieve the objects of the present disclosure, according to further another aspect of the present disclosure, a passenger transport device is further provided, which includes the synchronous motor as described above.

According to the motor stator assembly, the synchronous motor and the passenger transport device of the present disclosure, by providing a plurality of coil assemblies inserted in the stator base, the maintenance or replacement can be performed as needed, the maintenance is convenient, and less time-consuming, and also has reliable performances.

BRIEF DESCRIPTION OF THE DRAWINGS

FIG. 1 is a schematic diagram of an embodiment of a synchronous motor according to the present disclosure; and FIG. 2 is a schematic diagram of an embodiment of a coil assembly according to the present disclosure.

DETAILED DESCRIPTION OF THE EMBODIMENT(S) OF THE INVENTION

The present disclosure herein provides embodiments of a motor stator assembly and a synchronous motor. Referring to FIG. 1, a synchronous motor for generating an axial magnetic field is illustrated. The synchronous motor includes a motor stator assembly 100, a first rotor disc 200, a second rotor disc 300, and a drive shaft. The first rotor disc 200 and the second rotor disc 300 are respectively disposed on two sides of the stator base 110 in an axial direction; and the drive shaft passes through the first rotor disc 200, the motor stator assembly 100, and the second rotor disc sequentially in the axial direction 300.

More specifically, the motor stator assembly 100 shown in FIG. 1 includes a stator base 110 disposed axially around a motor drive shaft, the stator base 110 has a receiving space 112 and two stator end faces 111, and the receiving space 112 is disposed between the two stator end faces 111 and disposed along a circumferential outer side of the stator base 110. The motor stator assembly 100 further includes a plurality of coil assemblies 120 each inserted in the receiving space 112 in a radial direction of the stator base 110. In this arrangement, the stator base 110 and the coil assemblies 120 in the motor stator assembly 100 can be separately fabricated and subsequently assembled. The coil assemblies 120 are removed from the stator base 110 when they are required to be serviced or replaced. This enables service or replacement operation to be performed as needed, and makes the maintenance convenient and less time-consuming, while the motor stator assembly itself still has very reliable and efficient performance.

Referring again to FIG. 2, a specific configuration of the coil assembly 120 assembled in the motor stator assembly 100 is illustrated. The coil assembly 120 includes a core 121 extending in an axial direction, a coil disposed axially around the core 121, and a coil base 123 disposed axially around the core 121. The coil base 123 limits two axial ends of the coil. In this arrangement, the coil has a reliable positioning relative to the core so that an electromagnetic excitation effect can be stably and reliably generated when the coil is fitted into the stator base.

More specifically, the core 121 has an isosceles trapezoid-shaped cross section or a sector ring-shaped cross section in the axial direction so that when the cores 121 are uniformly arranged along a circumferential direction of the stator base of the motor stator assembly 100, a better matching is enabled, thereby ensuring work performance of the motor. In addition, as some optional specific configurations, the core 121 may be formed by laminating ferromagnetic materials; the coil may be made of a copper wire coated by an insulating layer; and the coil base 123 may be made of a flame retardant material having a temperature resistance of no less than 100° C.

Now turning to FIG. 1, an optional specific assembly arrangement of the coil assembly 120 and the stator base 110 is also illustrated. A plurality of positioning holes 111a are disposed in the stator end faces 111 of the stator base 110; wherein in an assembled state, the coil assemblies 120 are embedded in the positioning holes 111a of the stator base 110; and in a disassembled state, the coil assemblies 120 are conveniently removed out of the positioning holes 111a of the stator base 110.

More specifically, in order to ensure the electromagnetic excitation effect while facilitating the loading and unloading, a plurality of positioning holes 111a may be uniformly arranged in the stator end faces 111 in a circumferential direction; and at the same time, the coil assemblies 120 are uniformly embedded in the positioning holes 111a in the circumferential direction.

In addition, in order to ensure that the coil assemblies 120 do not fall off after being assembled to the receiving space in the stator base 110, a positioning ring 130 may be disposed and sleeved over an outer edge of the stator end face 111. The positioning ring 130 can be configured to restrict the coil assemblies 120 from being disengaged radially outward from the receiving space 112. On the basis of this, positioning protrusions 131 facing the receiving space 112 may be circumferentially disposed on the positioning rings 130. After the positioning rings 130 are sleeved in place, the positioning protrusions 131 are just captured between adjacent coil assemblies 120, and therefore can be better configured to restrict the coil assemblies 120 from being disengaged radially outward from the receiving space 112.

Optionally, a drive sleeve 113 extending in an axial direction may be disposed in a middle portion of the stator base 110, and a drive shaft hole 113a is axially disposed in the drive sleeve 113 for the drive shaft to pass through.

Moreover, the stator base may be integrally formed so as to improve product integration. In addition, the stator end face 111 can also be formed by connecting a plurality of stator end face sections 111b, 111c, thereby facilitating manufacture and installation.

Although the motor stator assembly used in the synchronous motor in the foregoing embodiment has been described above with reference to FIG. 1, in fact, the motor stator assembly can be applied to other motors as long as there is no conflicting configuration.

Referring again to FIG. 1, other components of the synchronous motor will be described below.

For example, for the rotor discs disposed on both sides of the motor stator assembly 100, the first rotor disc 200 may be circumferentially provided with a plurality of permanent magnets 210 on a side thereof facing the stator base 110; and the second rotor disc 300 may be circumferentially provided with a plurality of permanent magnets and/or steel magnets 310 on a side thereof facing the stator base 110. In this arrangement, it is possible to select either a solution in which a permanent-magnet rotor is only used on one side of the motor stator assembly 100 and a magnetic steel rotor is used on the other side to reduce cost; or a solution in which permanent-magnet rotor is used on both sides of the motor stator assembly 100 at the same time to improve the performance.

Optionally, as a specific arrangement, the first rotor disc 200 is provided with a plurality of mounting slots 220, and a plurality of permanent magnets 210 are embedded in the mounting slots 220; and the second rotor disc 300 is provided with a plurality of mounting slots 320. A plurality of permanent magnets and/or steel magnets 310 are embedded in the mounting slots 320.

Optionally, as a specific arrangement, a positioning strip 230 may be disposed along a circumferential outer side on a side of the first rotor disc 200 that faces the stator base 110, a positioning strip 330 may be disposed along a circumferential outer side on a side of the second rotor disc 300 that faces the stator base 110, and positioning slots are disposed on two sides of the stator base 110, so that the positioning strip 230 and 330 are fitted into the positioning slots respectively and an accurate positioning between the stator base and the rotor disc is formed.

Further, the plurality of permanent magnets and/or the plurality of steel magnets are arranged on the rotor discs in a circumferential direction with positive poles and negative poles being alternated.

Optionally, a middle portion of the first rotor disc 200 may also be provided with a matching hole 240 extending in the axial direction for the drive shaft to pass through, and a middle portion of the second rotor disc 300 may also be provided with a matching hole 340 extending in the axial direction for the drive shaft to pass through.

Additionally, although not shown in the drawings, an embodiment of a passenger transport device is also provided herein. The passenger transport device, such as an elevator, may include a synchronous motor as described in any of the foregoing embodiments or as described in a combination of the foregoing embodiments, and thus also has corresponding technical effects. Details are not described herein again.

The motor stator assembly, synchronous motor, and passenger transport device according to the present disclosure are mainly described in the above examples. While only some of the embodiments of the present disclosure have been described, those skilled in the art will understand that the present disclosure can be carried out in many other forms without departing from the spirit and scope thereof. Therefore, the illustrated examples and embodiments should be considered as illustrative rather than limiting, and the present disclosure can cover various modifications and replacements without departing from the spirit and scope of the present disclosure defined by individual appended claims.

What is claimed is:

1. A motor stator assembly, comprising:
   a stator disposed axially around a motor drive shaft, the stator having a receiving space and two stator end faces, and the receiving space being disposed between the two stator end faces and disposed along a circumferential outer side of the stator;
   a plurality of coil assemblies each inserted in the receiving space in a radial direction of the stator;
   positioning rings sleeved over outer edges of the stator end faces, the positioning rings configured to restrict the coil assemblies from being disengaged radially outward from the receiving space; and
   positioning protrusions facing the receiving space circumferentially disposed on the positioning rings, the positioning protrusions captured between adjacent coil assemblies, the positioning protrusions configured to restrict the coil assemblies from being disengaged radially outward from the receiving space.

2. The motor stator assembly according to claim 1, wherein a plurality of positioning holes are disposed in the stator end faces; wherein the coil assemblies are aligned with the positioning holes of the stator.

3. The motor stator assembly according to claim 2, wherein the plurality of positioning holes are uniformly arranged in the stator end faces in a circumferential direction, and the coil assemblies are uniformly embedded in the positioning holes in the circumferential direction.

4. The motor stator assembly according to claim 1, wherein a drive sleeve extending in an axial direction is disposed in a middle portion of the stator, and a drive shaft hole is axially disposed in the drive sleeve.

5. The motor stator assembly according to claim 1, wherein the stator is integrally formed.

6. The motor stator assembly according to claim 1, wherein the stator end faces are formed by connecting a plurality of stator end face sections.

7. The motor stator assembly according to claim 1, wherein the coil assembly comprises: a core extending in an axial direction; a coil disposed axially around the core; and a coil base disposed axially around the core; and wherein the coil base limits two axial ends of the coil.

8. The motor stator assembly according to claim 7, wherein the core has an isosceles trapezoid-shaped cross section or a sector ring-shaped cross section in the axial direction.

9. The motor stator assembly according to claim 7, wherein the core is formed by laminating ferromagnetic materials.

10. The motor stator assembly according to claim 7, wherein the coil is made of a copper wire coated by an insulating layer.

* * * * *